(12) United States Patent
Petrick

(10) Patent No.: US 9,381,846 B2
(45) Date of Patent: Jul. 5, 2016

(54) HAUL BODIES AND RELATED APPARATUS

(75) Inventor: Clarke M. Petrick, Alice Springs (AU)

(73) Assignee: Air Tip Pty, Ltd, Alice Springs (AU)

( * ) Notice: Subject to any disclaimer, the term of this patent is extended or adjusted under 35 U.S.C. 154(b) by 0 days.

(21) Appl. No.: 14/118,413

(22) PCT Filed: May 16, 2012

(86) PCT No.: PCT/AU2012/000546
§ 371 (c)(1),
(2), (4) Date: Nov. 18, 2013

(87) PCT Pub. No.: WO2012/155206
PCT Pub. Date: Nov. 22, 2012

(65) Prior Publication Data
US 2014/0091611 A1 Apr. 3, 2014

(30) Foreign Application Priority Data

May 17, 2011 (AU) .................. 2011901899
Mar. 15, 2012 (AU) .................. 2012901051

(51) Int. Cl.
*B60P 1/16* (2006.01)
*B60P 1/28* (2006.01)
(Continued)

(52) U.S. Cl.
CPC ............... *B60P 1/165* (2013.01); *B60G 9/003* (2013.01); *B60G 11/27* (2013.01); *B60G 99/002* (2013.01); *B60P 1/28* (2013.01); *B60G 2200/31* (2013.01);
(Continued)

(58) Field of Classification Search
CPC .............. B60P 1/28; B60P 1/16; B60P 1/165; B60P 1/283; B60G 9/003; B60G 99/002; B60G 2204/126; B60G 2200/31; B60G 2300/042; B60G 11/27; B60G 2202/152; B60G 2300/02
USPC .................. 298/11, 13, 17.7, 18, 19 R, 22 AE
See application file for complete search history.

(56) References Cited

U.S. PATENT DOCUMENTS

| 3,711,157 A | 1/1973 | Smock |
| 3,784,255 A | 1/1974 | Smock |
| 5,906,417 A * | 5/1999 | Golden ................... 298/17.6 |
| 2004/0211947 A1 | 10/2004 | Cadrain et al. |

FOREIGN PATENT DOCUMENTS

| CA | 2498083 A1 | 8/2006 |
| CN | 87214886 U | 8/1988 |

OTHER PUBLICATIONS

Australian International-Type Search Report for Application No. 2011901899, mailed Nov. 18, 2011 (4 pages).
(Continued)

*Primary Examiner* — Stephen Gordon
(74) *Attorney, Agent, or Firm* — Nutter McClennen & Fish LLP; John J. Penny, Jr.

(57) ABSTRACT

The invention relates to a tipping haul body such as a tipping trailer (10). The tipping trailer (10) includes at least one axle (12) and a tub base (40). The tub base (40) is arranged to support the load of a payload receiving tub (20) of the trailer (10) and to transmit that load via the at least one axle (12) to a ground surface. The tub base (40) and the tub (20) are arranged to be connected together and to pivot together about a pivot axis ($P_1$) when the trailer (10) is activated to dump a payload from the tub (20). The invention also relates to a tipping and suspension unit for a haul body such as trailer or a dolly.

19 Claims, 16 Drawing Sheets

(51) Int. Cl.
*B60G 9/00* (2006.01)
*B60G 11/27* (2006.01)
*B60G 99/00* (2010.01)

(52) U.S. Cl.
CPC ..... *B60G 2202/152* (2013.01); *B60G 2204/126* (2013.01); *B60G 2300/02* (2013.01); *B60G 2300/042* (2013.01); *B60G 2800/20* (2013.01)

(56) References Cited

OTHER PUBLICATIONS

International Search Report for Application No. PCT/AU 2012/000546, mailed Jul. 18, 2012 (5 pages).
International Preliminary Report on Patentability for Application No. PCT/AU2012/000546, mailed Aug. 28, 2013 (9 pages).

\* cited by examiner

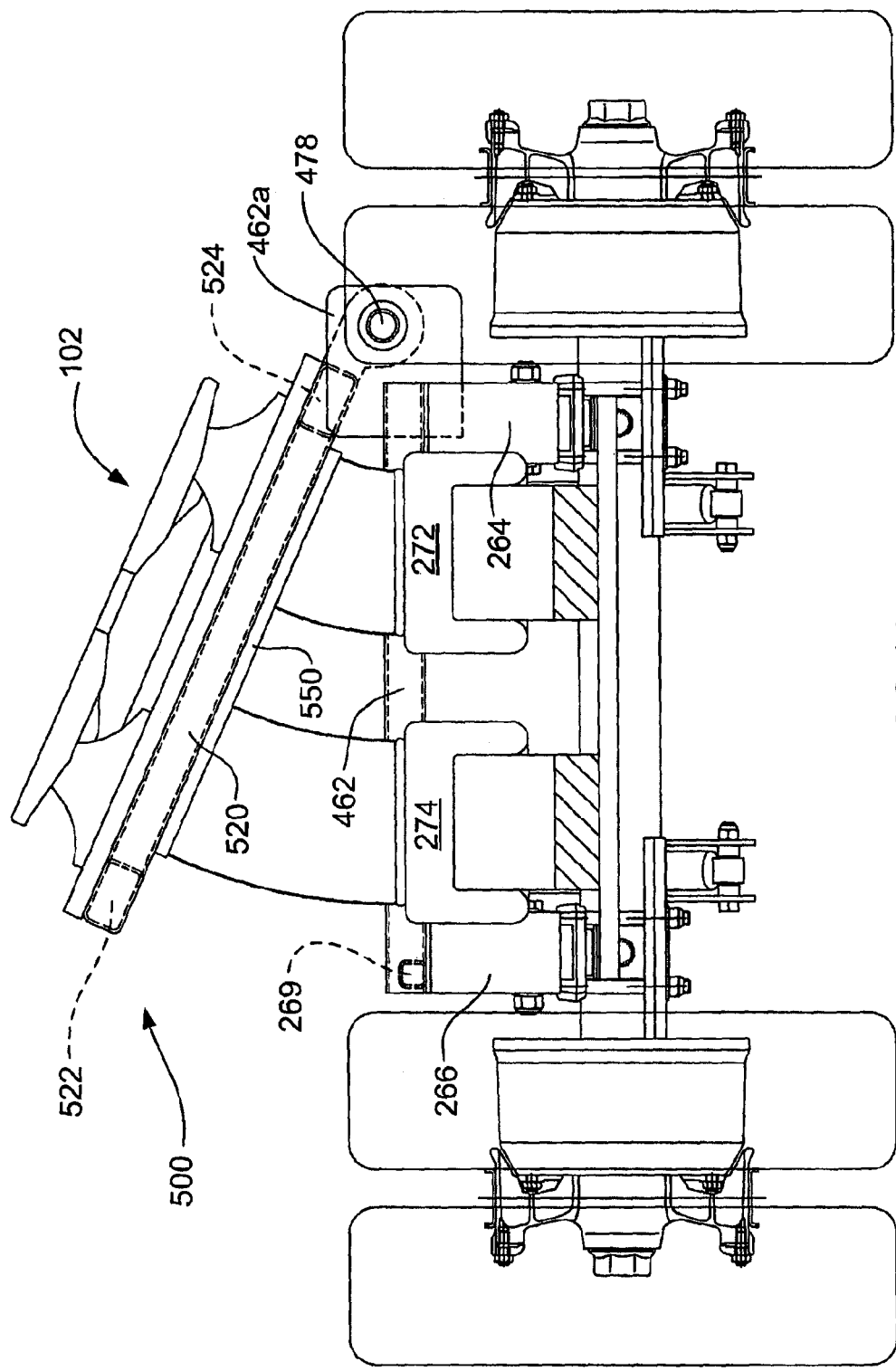

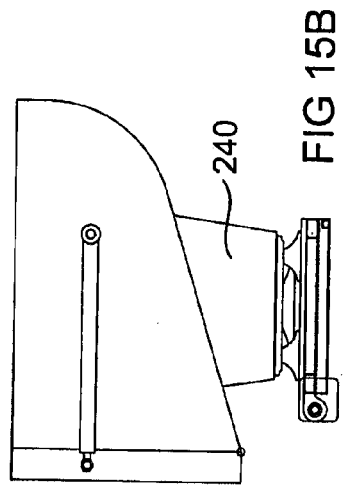
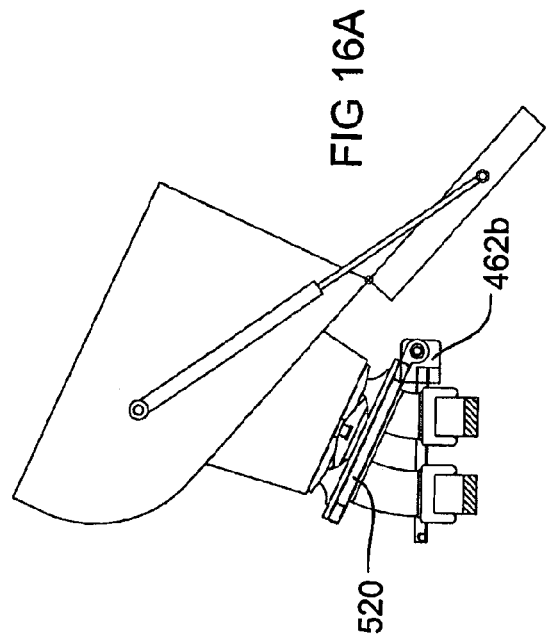
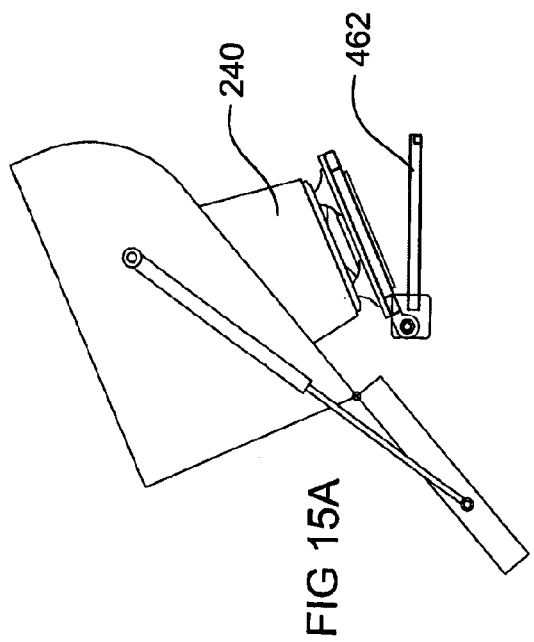
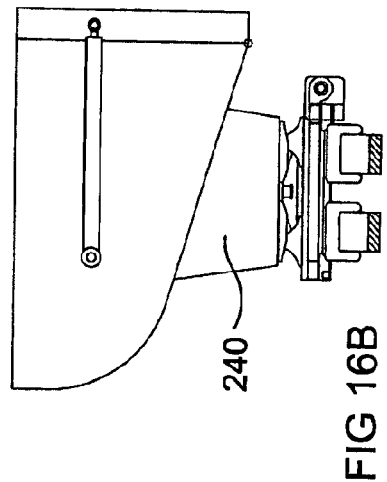

HAUL BODIES AND RELATED APPARATUS

RELATED APPLICATION

This application claims priority from Australian Provisional Patent Applications 2011901899 and 2012901051, the contents of which are incorporated herein by reference.

FIELD OF THE INVENTION

The present invention relates to haul bodies and related apparatus. More particularly the invention provides an improved side tipping haul body, tipper trailer, dolly or other similar vehicle and related components. The invention has particular application in the bulk transport industry.

BACKGROUND OF THE INVENTION

Haul bodies are commonly used to haul various bulk materials such as rock, sand, gravel, dirt and agricultural products. Many such haul bodies are capable of dumping bulk materials by elevating or pivoting at least a portion of the haul body, for example the tub. Common examples of such haul bodies are rear dumping dump trucks, side dumping haul bodies and side tipping trailers.

A typical side dumping haul body includes a tub that is tilted until its payload spills over a side wall and is expelled to the discharge side of the haul body. In accordance with one prior art arrangement known as a side tipping trailer, the tub is mounted on a conventional sub frame or chassis arrangement that includes a pair of elongate rails running the full length of the trailer joined by a series of cross members. The haul body or tub is pivotally connected to the chassis arrangement so that the tub can be pivoted to either the left or right hand side of the trailer (i.e. the discharge side). A pair of hydraulic cylinders, one cylinder located at each end of the tub of the haul body, is operated to cause pivotal movement of the tub about the pivotal connection. The hydraulic cylinders and hydraulic pump(s) located on the trailer or associated vehicle greatly increase the road tonnage of the vehicle, increasing fuel costs and limiting the payload weight that can be carried in the tub.

Another form of haul body or dump vehicle is described in U.S. Pat. No. 3,784,255. That patent describes a dump vehicle having a dump body or tub pivotally mounted on a vehicle chassis frame for movement between a horizontal normal position and an inclined dumping position. This pivotal movement is achieved by an air bag or bellows assembly that raises and lowers the dump body to pivot it about a pivotal connection located above the chassis frame and to one side thereof. The chassis frame is fixed to the axles of the dump vehicle and does not pivot with the dump body. As shown in U.S. Pat. No. 3,784,255, the trailer includes multiple dump bodies, each mounted on the vehicle chassis frame that extends along the full length of the dump vehicle.

Conventionally, the tub of the haul body is configured as an elongate flat-bottomed tub. The sidewalls are sometimes angled with respect to the vertical to aid the dumping process. The sidewalls are often relatively shallow to facilitate dumping of materials. However, this can be problematic as it leads to a length-to-capacity ratio that is large when compared to other types of haul bodies and increases the bending moments on the body during tipping.

Some haul bodies have a movable sidewall that can open outwardly to allow release of the payload as the tub is tilted. By incorporating a hinged movable sidewall, the length-to-capacity ratio can be decreased. However, the inclusion of a hinged sidewall may increase the risk of damaging the sidewall whilst discharging the payload. Furthermore, difficulties often occur in controlling movement of the sidewall between the open and closed position.

It would be advantageous to reduce the overall weight of the haul body. Any weight reduction achievable is advantageous because it reduces the weight of the non-loaded haul body and thus increases the permissible weight of payload that can be legally loaded into the haul body tub, whilst still not exceeding total weight limits. In other words, any decrease in total haul body weight permits an increased payload to be legally transported, increasing transport efficiencies.

The discussion of the background to the invention herein is included to explain the context of the invention. This is not to be taken as an admission that any of the material referred to was published, known or part of the common general knowledge as at the priority date of this application.

The present invention seeks to provide an improved haul body such as a side tipper trailer, a dolly or like vehicle. The invention further provides a tipping unit for a haul body.

SUMMARY OF THE INVENTION

According to a first aspect of the present invention there is provided a tipping and suspension unit for a haul body. The haul body may for example be a side tipping trailer or a dolly to which a side tipping trailer may be attached. The tipping and suspension unit includes at least one axle extending in a transverse direction, right and left side suspension trailing arms extending in a longitudinal direction and arranged to each be connected to the at least one axle, each suspension trailing arm including a leading end and a trailing end, the leading end being arranged to be connected to an associated suspension tower, a support member connected transversely between the suspension towers, a hinging member arranged for connection to a tub of the haul body or a trailer arranged for connection to the haul body, and wherein said hinging member is pivotally connected to the support member for movement about a pivot axis extending in the longitudinal direction, and at least one actuator arranged to enable pivoting movement of the hinging member about the pivot axis.

In accordance with one embodiment of the first aspect of the invention, the haul body is a side tipping trailer arranged for connection at a leading end to a conventional dolly. The trailer is fitted with multiple, for example three, tipping and suspension units adjacent the trailing end of the trailer.

The tub of the haul body is preferably supported by an elongate tub base. The tub base is arranged to support the load of the tub and any contents and to transmit that load via the axles of the tipping units to a ground surface. The hinging member of each tipping unit is arranged for connection to the tub base Preferably, the at least one actuator includes an air bag arrangement. However, it is envisaged that the at least one actuator may adopt other forms. For example, the at least one actuator may be a hydraulic or pneumatic actuator or other device functioning to provide pivoting or tipping movement of the hinging member about the pivot axis.

Each suspension tower of each tipping unit is preferably located on a leading side of the associated axle and the associated actuator, for example an air bag arrangement, is located on a trailing side of the axle.

The trailing ends of the suspension trailing arms of each tipping unit are preferably connected together by a transverse mounting plate. The air bag arrangement, in the form of a first and a second air bag assembly, is preferably mounted on the mounting plate. An upper end of each of the first and second air bag assembly of each tipping unit is preferably attached to the tub base so that when the air bag assemblies are inflated they press upwardly against the tub base causing the tub base and attached tub to lift upwardly and to pivot about the pivot axis. In this manner, the tub base and attached tub can be moved from a normal transit position to a discharge or tipping position.

The inflation and deflation of the air bag assemblies is preferably controlled by a control system. The control system, air compressor and/or other related components for charging and discharging the air bag assemblies are preferably mounted on a prime mover arranged to haul the haul body. However, other locations for these items are contemplated within the scope of the invention.

The air bag arrangement of each tipping unit is preferably arranged to tip the base of the tub at an angle through a range of 0-35°. The base of the tub is preferably angled to reduce the amount of tipping to discharge product from the tipping trailer. In accordance with a preferred embodiment of the invention, the base of the tub angles downwardly from the horizontal at an angle in the range of 10-30°.

When the haul body is a side tipping trailer with a tub having an angled base, the combination of the angled base of the tub and the tipping of the tub provides a maximum tipping angle for the base of up to about 65°.

It is envisaged that the actuator of each tipping and suspension unit of the haul body, in addition to providing the tipping of the connected tub base and tub, will be configured to also provide air bag suspension for the haul body. Preferably, the actuator is an air bag arrangement arranged to further provide air bag suspension for the haul body. An additional air bag suspension system will advantageously not be required in most circumstances.

Still further, the invention provides in a second aspect a tipping and suspension unit for a leading end of a haul body. The haul body is preferably a side tipping trailer. The unit includes a support member connected transversely between first and second supports extending in a longitudinal direction, an arrangement for supporting a tub of the trailer, said arrangement configured for pivotal connection to the support member for movement about a pivot axis extending in the longitudinal direction, and at least one actuator arranged to enable pivoting movement of the supporting arrangement about the pivot axis.

In accordance with an embodiment of the second aspect of the invention, the first and second supports and the supporting member form a frame and a king pin is mounted on the frame for connecting the leading end of the trailer to a $5^{th}$ wheel of a dolly or other vehicle.

The at least one actuator is preferably an air bag arrangement configured to provide both tipping and suspension for the leading end of the trailer.

The invention further provides in a third aspect a tipping haul body including at least one axle extending in a transverse direction, right and left side suspension trailing arms extending in a longitudinal direction and arranged to each be connected to the at least one axle, each suspension trailing arm including a leading end and a trailing end, the leading end being arranged to be connected to an associated suspension tower, a support member connected transversely between the suspension towers, an elongate tub base connected to a payload receiving tub, said tub base being pivotally connected to the support member for movement about a pivot axis, at least one actuator connected to the tub base and wherein the at least one actuator can be activated to cause pivoting movement of the tub base and tub about the pivot axis.

In accordance with each aspect of the invention, the at least one actuator is preferably arranged to provide both a tipping and a suspension function.

In another arrangement, the invention provides a tipping haul body including a tub for receiving a payload and a tub base, wherein the tub base is arranged to support the load of the tub of the haul body and to transmit that load via at least one axle of the haul body to a ground surface. Such an arrangement is particularly advantageous as it negates the need for a traditional chassis arrangement to provide structural support.

DESCRIPTION OF THE DRAWINGS

Embodiments of the invention will now be described, by way of example only, with reference to the accompanying drawings in which:

FIG. 14 is a rear view of the dolly shown in FIG. 13 in the tipped position;

FIGS. 15A and 15B are front views of the dolly shown in FIG. 13 respectively in the tipped and the transit position; and FIGS. 16A and 16B are rear views of the dolly shown in FIG. 13 respectively in the tipped and the transit position.

DETAILED DESCRIPTION OF THE PREFERRED EMBODIMENTS

The present invention has application on a wide range of different wheeled transports, for example, side tipping trailers, side tipping trucks and dollies.

Figure 1:
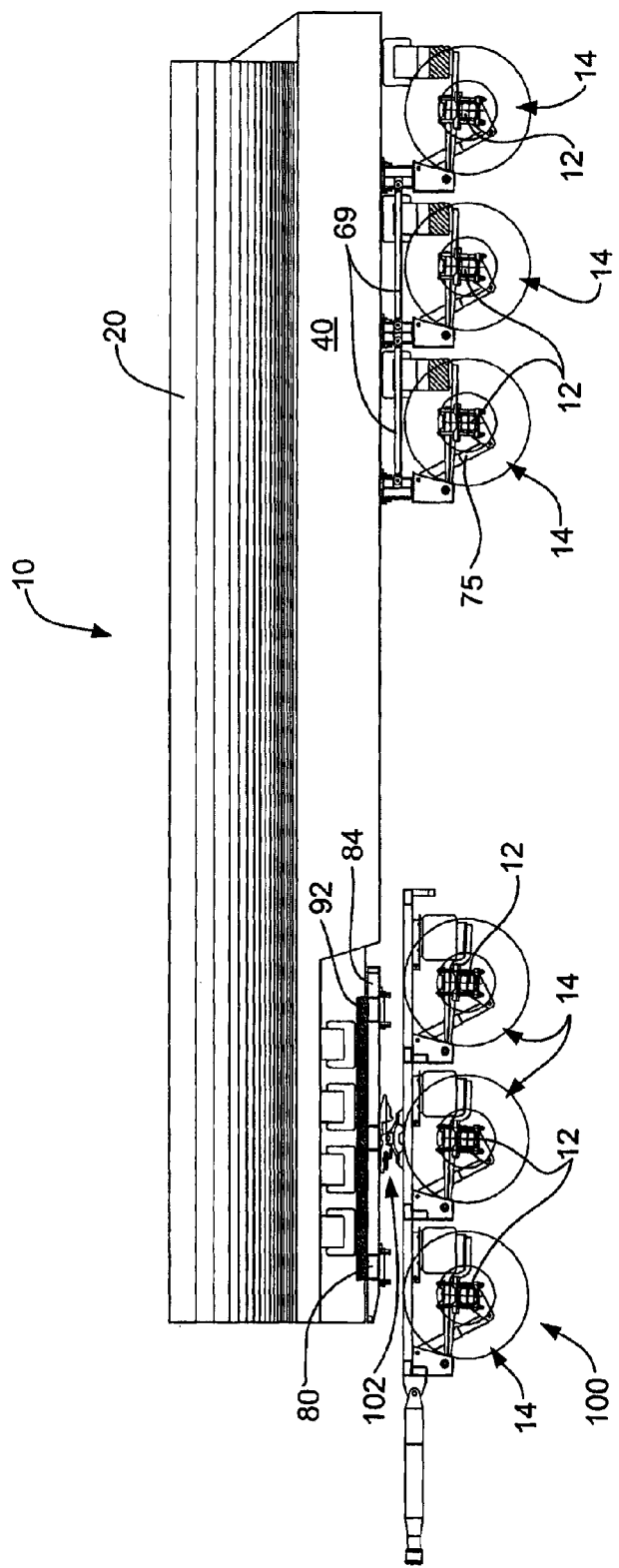
FIG. 1 is a first side view of a trailer according to an embodiment of the invention attached to a conventional dolly.
Figure 2:
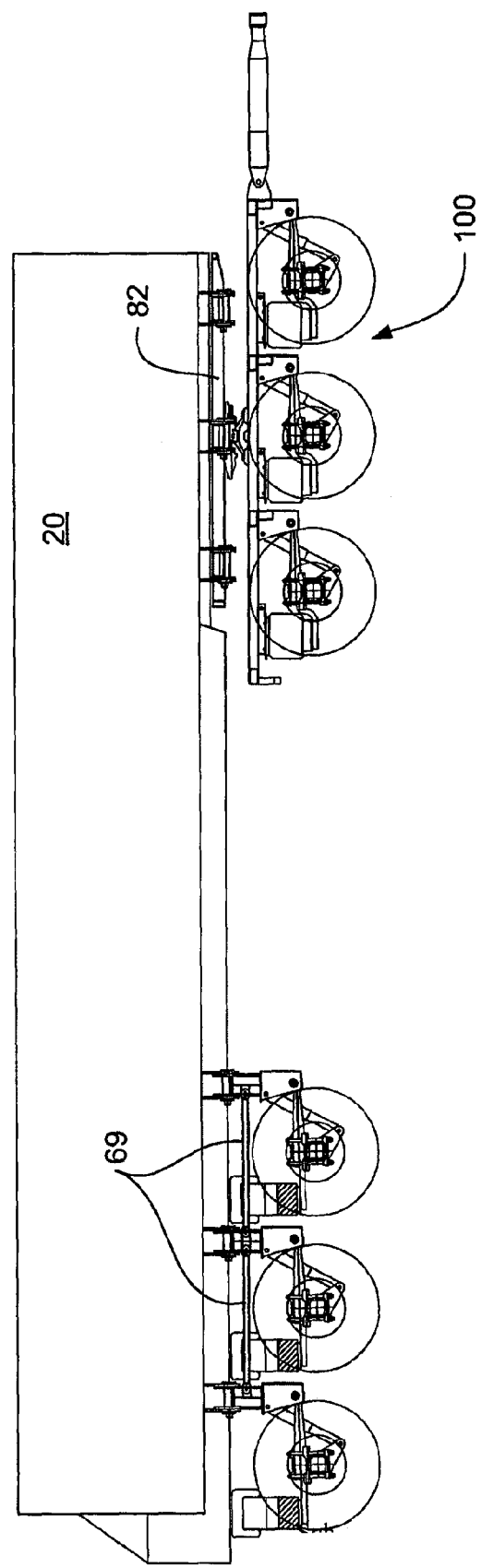
FIG. 2 is a second side view of the trailer and dolly shown in FIG. 1.

The Figures illustrate a side tipping trailer 10 according to an embodiment of the invention. As best shown in FIGS. 1 and 2, the trailer 10 is arranged to be connected to a conventional dolly 100 via a $5^{th}$ wheel 102. The $5^{th}$ wheel 102 or turn table is a standard hitch of the type that allows articulation of multi combination vehicles.

The trailer 10 and dolly 100 are each fitted with three axles 12 with associated wheel sets 14. The axles 12 and associated wheel sets 14 adopt a conventional form. The number of axles 12 on each of the trailer 10 and dolly 100 may vary and the configurations illustrated in the Figures are merely exemplary.

Figure 4:
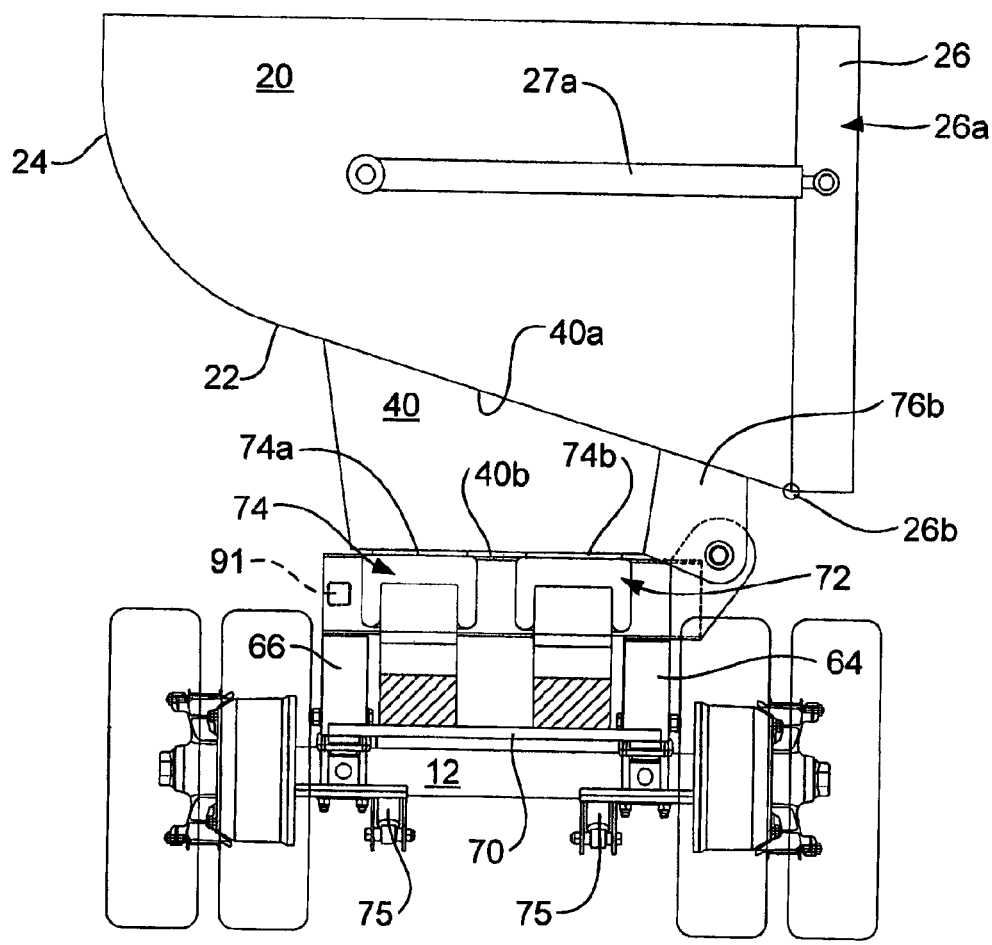
FIG. 4 is rear end view of the trailer shown in FIG. 1.

The side tipping trailer 10 includes a haul body tub 20. As best shown in FIG. 4, the tub 20 includes a floor 22, first and second side walls 24, 26 and front and rear end walls 28, 30. The second side wall 26 includes a pivotal door 26a arranged to pivot about a pivot axis 26b adjacent to the floor 22. Pivotal movement of the door 26a is controlled by a pair of actuators 27a, 27b.

Figure 5:
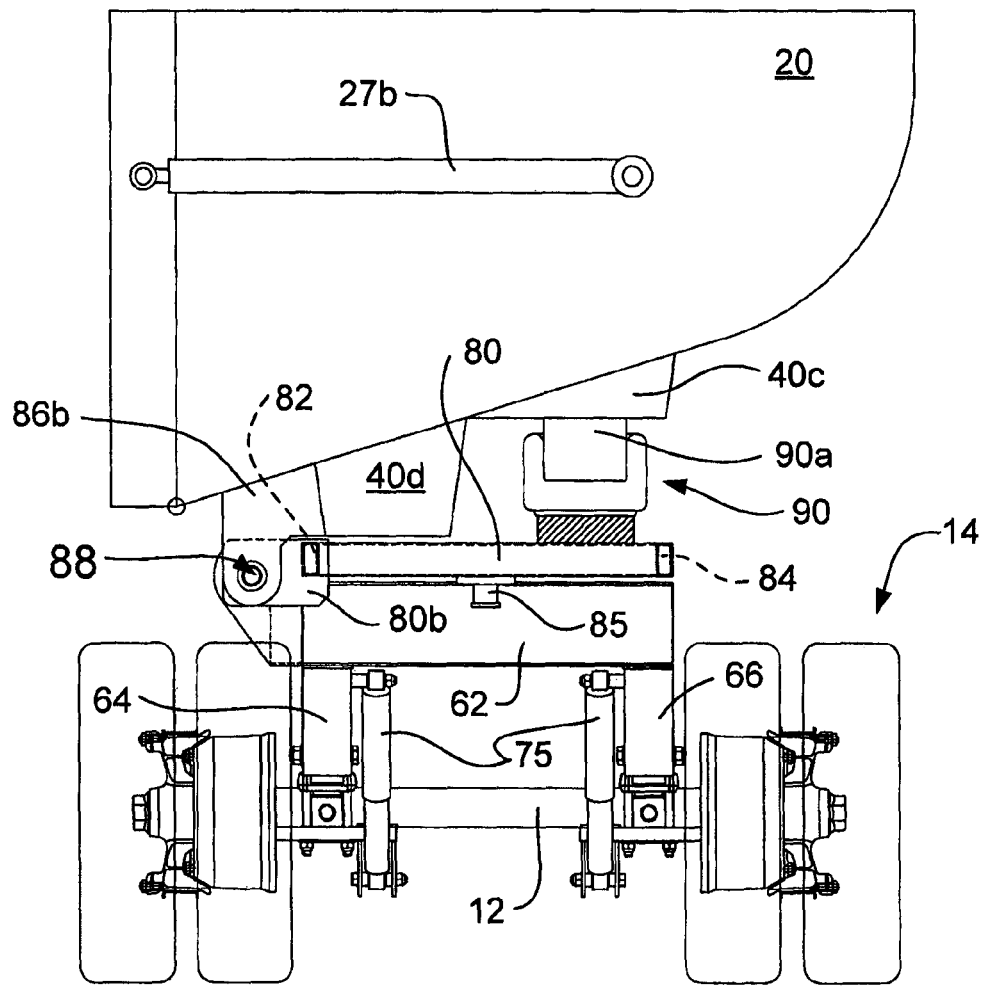
FIG. 5 is a front end view of the trailer shown in FIG. 1.

The floor 22 and the first and second side walls 24, 26 are configured so that the floor 22 slopes downwardly from the first side wall 24 to the second side wall 26. The sloping configuration of the floor 22 of the tub 20 is best illustrated in FIGS. 4 and 5.

The pivotal door 26a is preferably curved on its discharge face 26a' to aid discharge of the payload from the tub 20. When the tub 20 is in the tipping position (FIG. 9), the curved discharge face 26a is such that the slope increases towards the outer edge of the door 26a. This means that the payload will move quickly off the door 26a reducing the load time on the door 26a and any stress on the door hinges.

The floor 22 of the tub 20 is angled to reduce the amount of tipping of the tub 20 required to enable full discharge of payload from the tub 20. The floor 22 of the tub 20 angles downwardly from the horizontal at an angle preferably in the range of 10-30°.

The haul body tub 20 is mounted on a longitudinally extending support arrangement that may adopt different forms. As illustrated, the support arrangement is formed as a tub base 40 that extends along the length of the tub 20. The tub base 40 has an upper surface 40a that supports and is connected to the underside of the floor 22 of the tub 20 and a lower surface 40b that engages with a combined tipping and suspension system. As will be explained in detail below, the tipping arrangement of the combined tipping and suspension system enables the tub 20 to be tipped relative to a longitudinal axis of the tub 20 so that a payload can be discharged via the pivotal door 26a to a discharge side of the trailer 10.

The tub base 40 can adopt different constructions and may not always extend along the entire length of the tub 20. However, it must be arranged to transmit the load of the tub 20 and any payload to the axles 12 of the trailer 10 and thus to a ground surface on which the trailer 10 is supported. It is envisaged that the tub base 40 may be made from metal plates and may adopt a box like structure. It is advantageous to minimise the weight of the tub base 40.

As shown in FIG. 1, the tub base 40 extends along the length of the tub 20. However, it is envisaged that the shape of the tub base 40 may vary along the length of the tub 20. Indeed as best shown in FIGS. 1 and 5, the tub base 40 changes shape in the area above the dolly 100 so that connection to a conventional dolly 100 can be accommodated. More particularly, the cross sectional shape of the tub base 40 changes towards the leading end of the trailer 10 so as to include right and left base portions 40c, 40d (as viewed in FIG. 5). The function of the base portions 40c, 40d will be apparent from subsequent discussions in relation to the connection of the trailer 10 to the dolly 100.

As depicted, the trailer 10 includes three tipping and suspension units 60. Each unit 60 includes one of the axles 12 of the trailer 10 (see FIG. 3).

Figure 6:
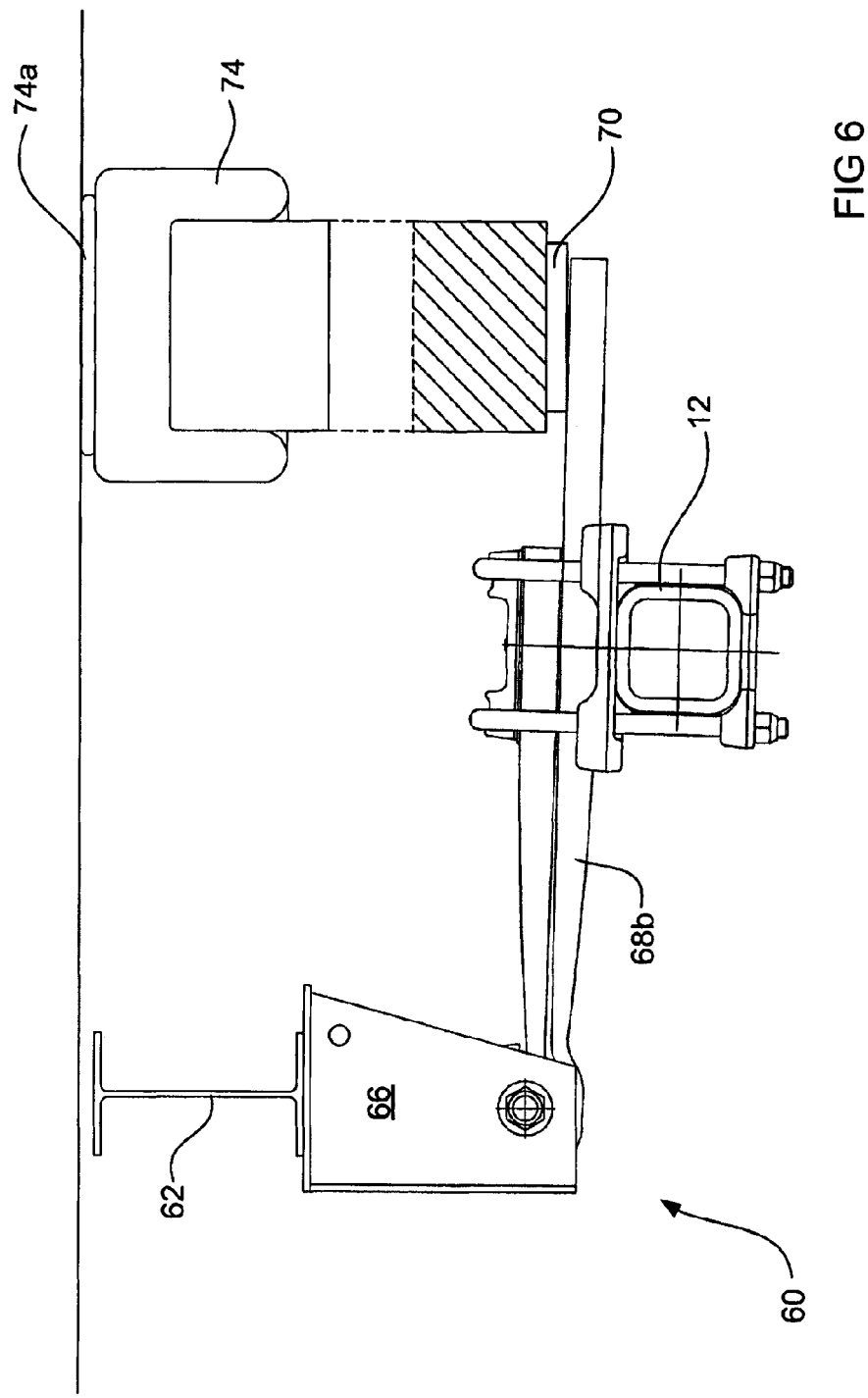
FIG. 6 is an enlarged side view of one of the tipping and suspension units of the trailer shown in FIG. 1.
Figure 7:
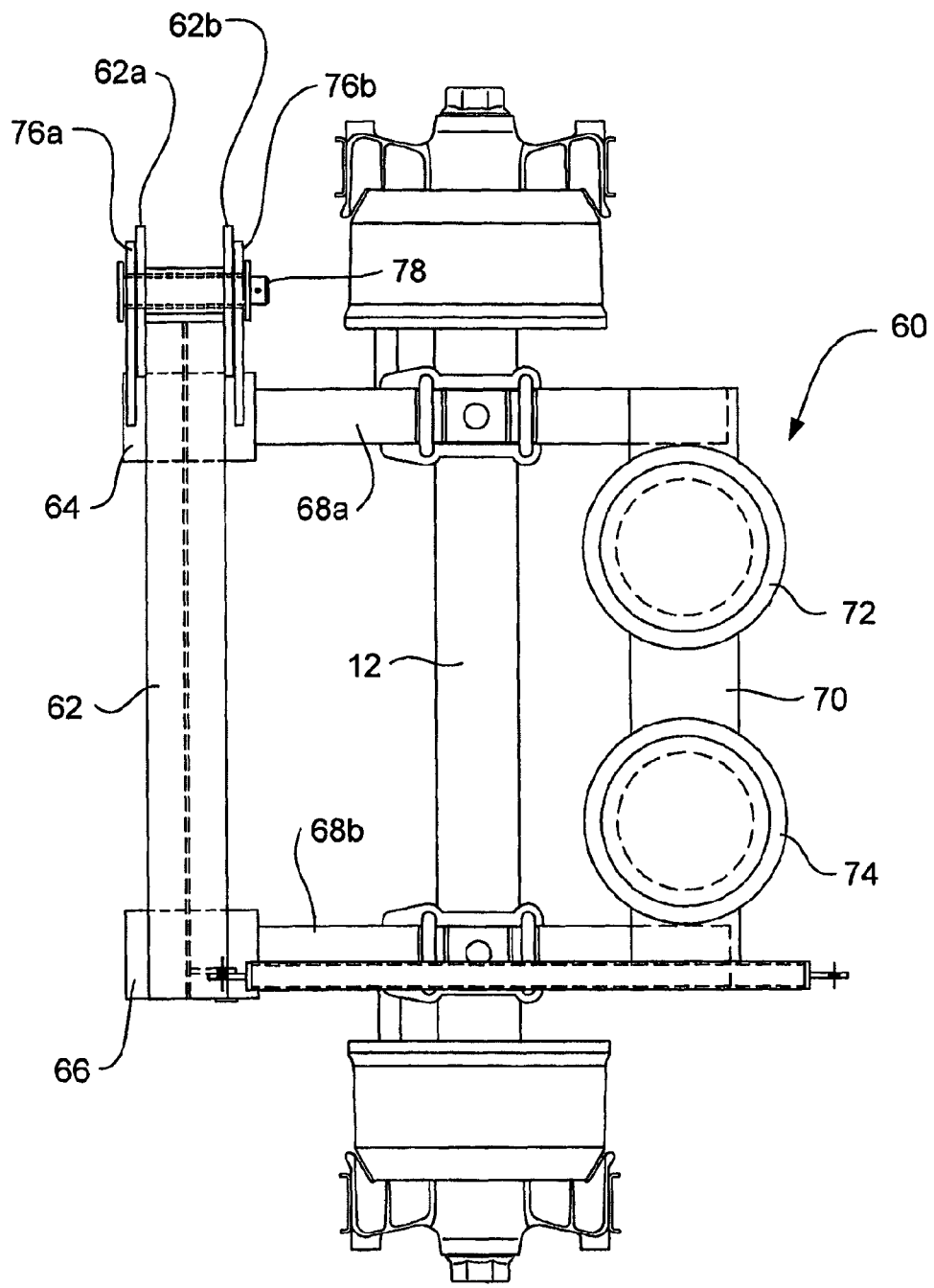
FIG. 7 is an enlarged top view of one of the tipping and suspension units of the trailer shown in FIG. 1.

As best shown in FIGS. 6 and 7, each tipping and suspension unit 60 further includes a support member 62 that extends transversely to the longitudinal axis of the tub 20 and is connected between right and left side suspension towers 64, 66. The suspension towers 64, 66 are located on a leading side of the associated axle 12 (as viewed in FIG. 6). Connected to the lower end of each right and left suspension towers 64, 66 are respective right and left suspension trailing arm 68a, 68b. Each suspension trailing arm 68a, 68b connects along its length to the associated axle 12 in the conventional manner. A transverse air bag mounting plate 70 extends between the right and left trailing arms 68a, 68b and provides a base for mounting of the first and second air bag assemblies 72, 74. Shock absorbers 75 (see FIGS. 1 and 3) are connected between the axle 12 and each of the right and left suspension towers 64, 66.

Stiffening struts 69 are provided between the ends of the support members 62 to stiffen the tipping and suspension units.

Figure 8:
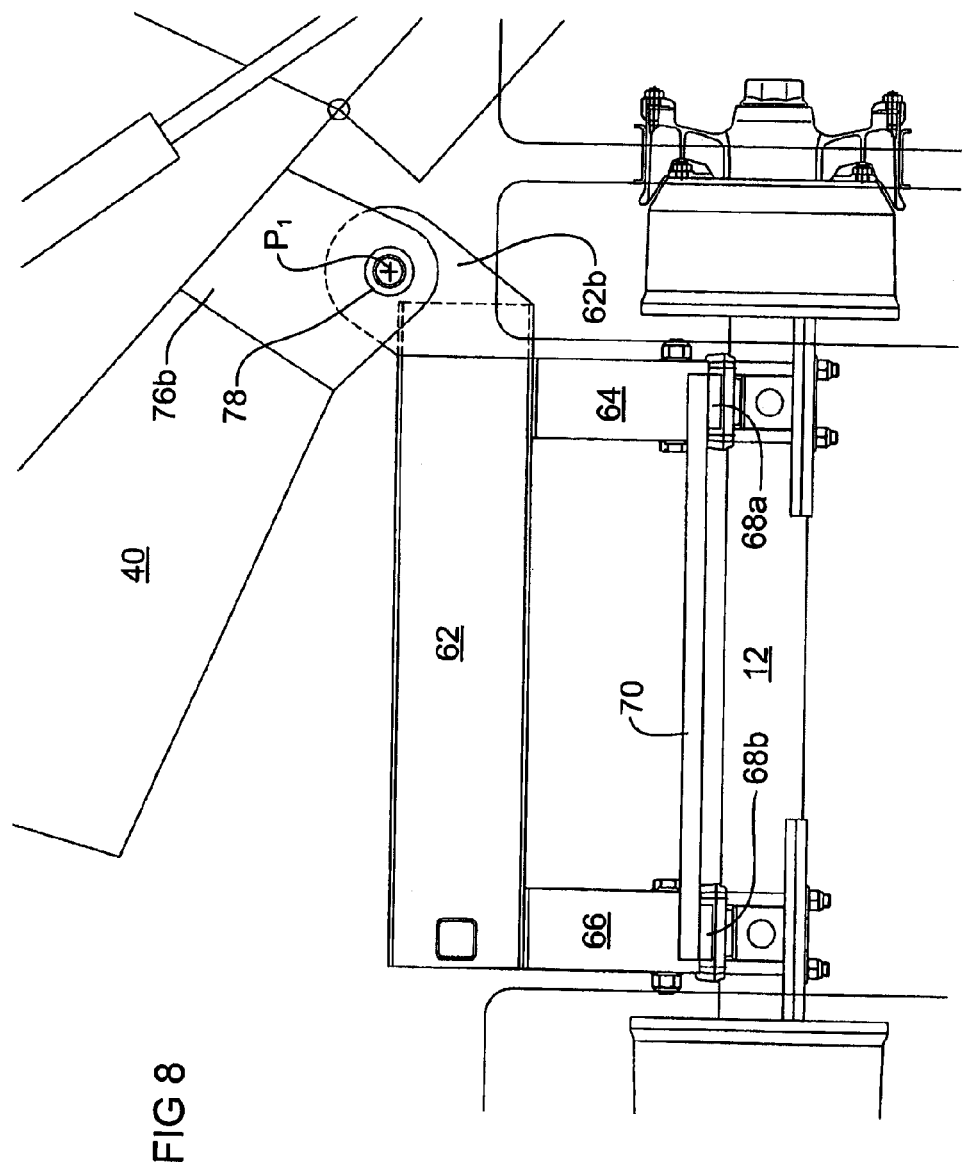
FIG. 8 is an enlarged view of a portion of the rear end of the trailer with the air bag arrangements removed.

As viewed in FIG. 8, the right hand end of the support member 62 is arranged for pivotal connection to the tub base 40. To this end, as shown in FIG. 7, a pair of plates 76a, 76b, establishing a hinging member, extend from the tub base 40 and are arranged to receive there between the right hand end of the support member 62. The right hand end of the support member 62A includes extension plates 62a, 62b. A connector 78 extends through aligned apertures in the plates 76a, 76b and extension plates 62a, 62b. The connector 78 establishes a longitudinal pivot axis $P_1$ (see FIGS. 3 and 8) that is parallel to the longitudinal axis of the tub 20 and about which tub base 40 and attached tub 20 can be pivoted to enable tipping of the tub 20 to release a payload.

Pivot axis $P_1$ is located so that the path of movement of the top face of each of the air bag assemblies 72, 74 does not result in unacceptable buckling of the walls of the associated air bags or contact with the inner air piston located beneath the air bag. This is achieved by locating the pivot axis $P_1$ to the right of the vertical centreline of each air bag (as viewed in FIGS. 4 and 8) and above the upper end 72a, 72b of each air bag assembly 72, 74. Such a location of the pivot axis $P_1$ results in a point on the top face of the air bag of each air bag assembly 72, 74 subscribing an arc during operation of the air bag assembly 72, 74. The point on the upper end 72a, 72b initially moves in a direction to the left of the centreline of the air bag before crossing back over the centreline as it moves right in the direction of the pivot axis $P_1$. This reduces the maximum distance the air bag deflects from the vertical centreline during the initial extension phase of each air bag assembly.

Figure 9:
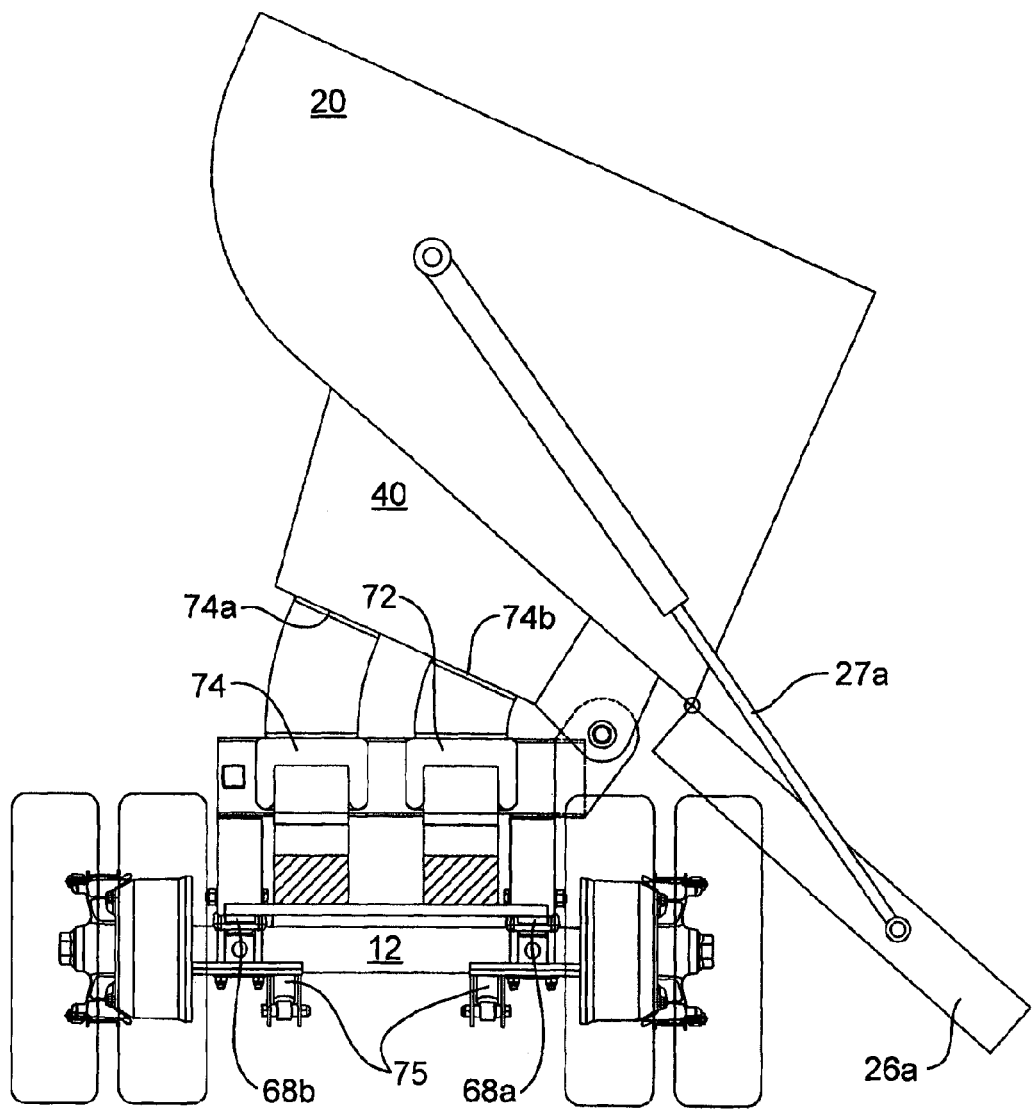
FIG. 9 is a rear end view of the trailer in the tipped configuration.
Figure 10:
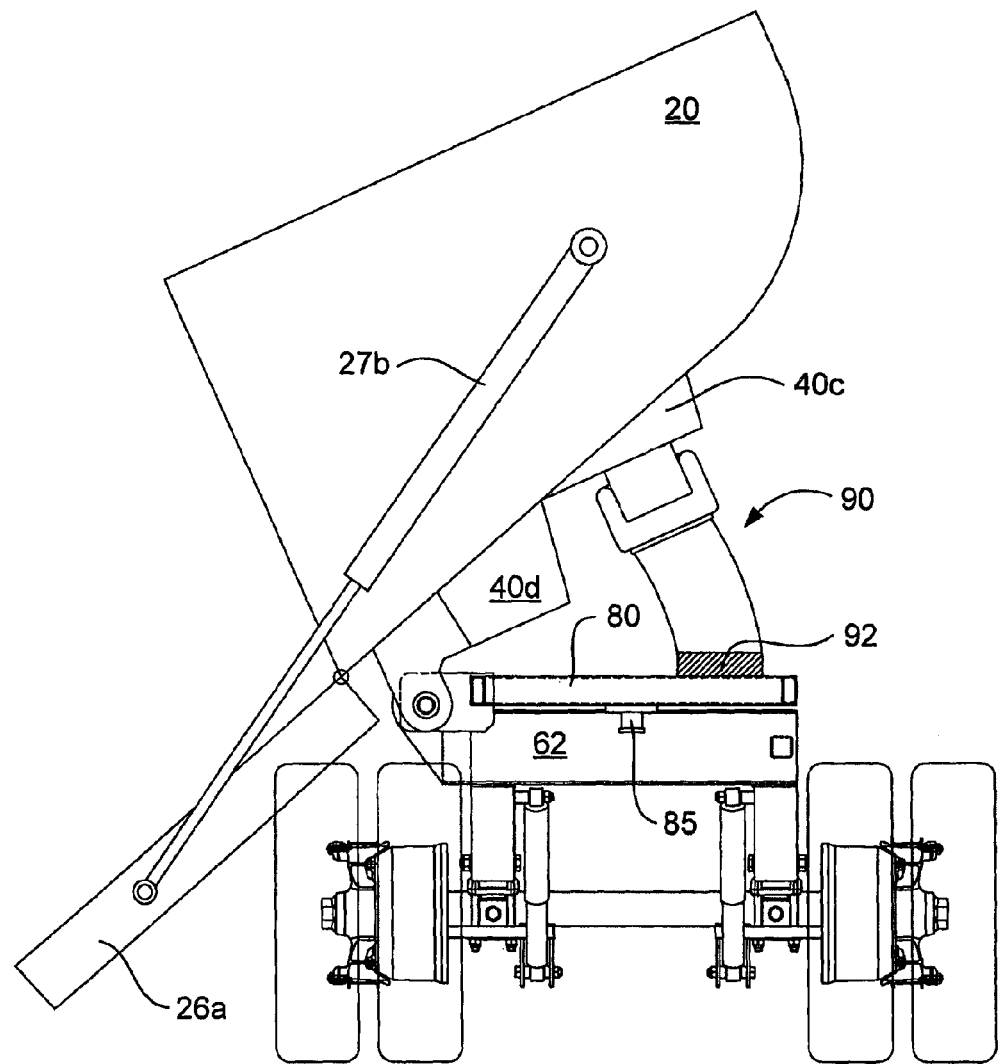
FIG. 10 is a front end view of the trailer in the tipped configuration.

The first and second air bag assemblies 72, 74 are mounted on the air bag mounting plate 70. The upper end 72a, 74a of each air bag assembly 72, 74 is attached to the lower face 40b of the tub base 40. It will thus be appreciated then when the air bag assemblies 72, 74 are inflated they will press upwardly against the tub base 40 causing the tub base to lift upwardly and to pivot about the longitudinal pivot axis $P_1$ of the connector 78. In this manner, the tub 20 and attached tub base 40 can be moved from their normal transit position (FIG. 4) to a discharge position (FIG. 9). Deflation of the air bag assemblies 72, 74 returns the tub 20 and attached tub base 40 from the discharge position to the normal transit position.

It will of course be appreciated that tipping of the tub 20 to discharge the payload will not be possible unless the leading end of the trailer 100 that is connected to the dolly 100 or to a prime mover can also be tipped.

Figure 3:
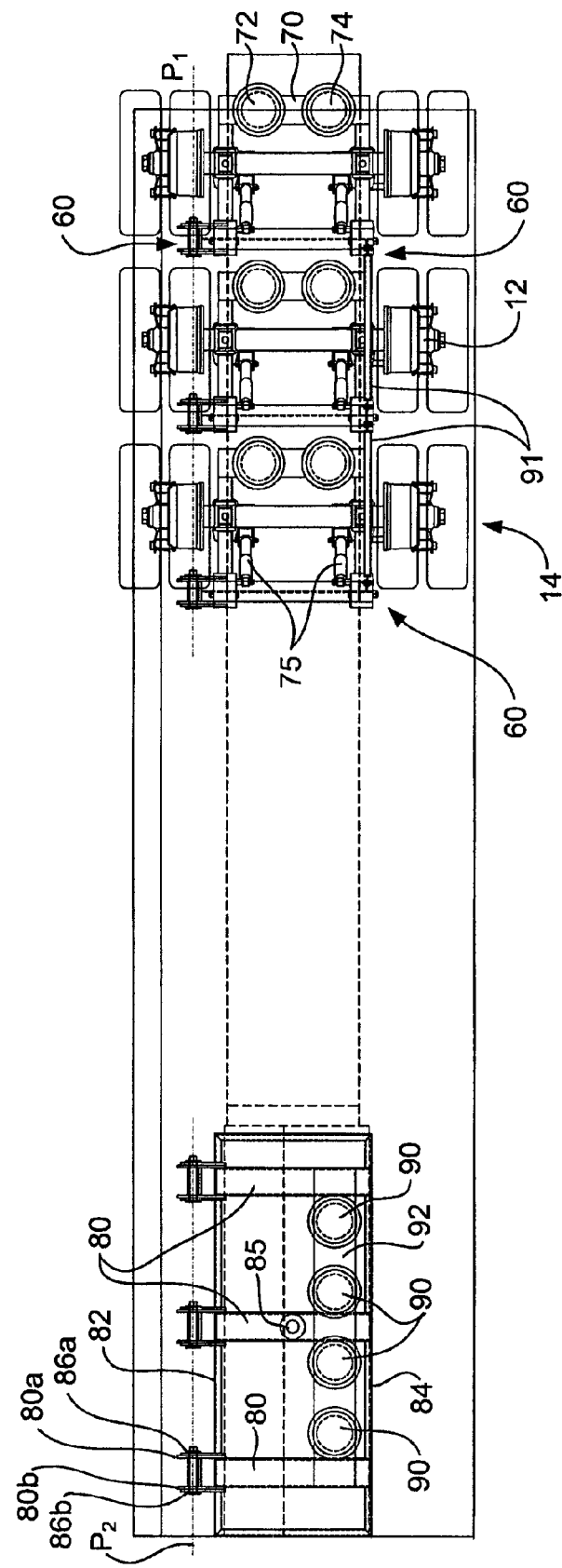
FIG. 3 is a top view of the trailer shown in FIG. 1.

When the trailer 10 is connected to a conventional dolly or directly to a prime mover, the leading end of the trailer 10 may adopt the configuration best shown in FIGS. 1, 3 and 5. As depicted in FIG. 3, three support members 80 extend transversely between and connect to left and right beams 82, 84 to form a frame. Connected to the lower face of the centre support member 80 is a king pin 85. The king pin 85 enables connection of the frame to the fifth wheel 102 located on the dolly 100. The left and right beams 82, 84 and support members 80 transmit the load of the front end of the trailer 10 to the dolly 100.

Each support member 80 is similar to the support members 62 described previously and is arranged for pivotal connection to the tub base 40 along a longitudinal pivot axis $P_2$. The longitudinal pivot axis $P_2$ is coaxial with the longitudinal pivot axis $P_1$. Pivotal connection is achieved via a pair of plates 86a, 86b that extend from the left base portion 40d and form a hinging member. Extending from the left hand end of the support member 80 is a pair of connection plates 80a, 80b. The connection plates 80a, 80b locate between the pair of plates 86a, 86b and a connector 88 extends through aligned apertures in the plates 86a, 86b and the plates 80a, 80b of the support member 80. The connector 88 establishes the longitudinal pivot axis $P_2$.

Air bag assemblies 90 are mounted on a mounting plate 92 located parallel to the right and left beams 82, 84. As shown in FIG. 3, four air bag assemblies 90 are provided. It will of course be appreciated that the number of air bag assemblies 90 will depend on the length of the right and left beams 82, 84.

The upper end 90a of each air bag assembly 90 is connected to the lower face of the right base portion 40c of the base 40. The lower face of the left base portion 40d is arranged to rest on the left beam 80. Although not illustrated, a rubber stopper would preferably be provided therebetween to cushion the left base portion 40d of the tub base 40. Loading from the tub 20 is preferably shared equally by the right base portion 40c, left base portion 40d and the pair of plates 86a, 86b and that loading is transmitted to the axle 12 of the dolly 100 when the tub is in the normal transit position.

When the air bag assemblies 90 are activated, they push the right base portion 40c upwardly causing the base portion 40c and attached tub 20 to pivot about the longitudinal pivot axis $P_2$. Air bag assemblies 90 will of course be activated in conjunction with the air bag assemblies 72, 74 of each of the tipping and suspension units 60.

As depicted, the air bag assemblies 90 are located the opposite way to the air bag assemblies 72, 74 of each of the tipping and suspension units 60. This ensures that the air bag assemblies 90, which are located vertically above the turn table of the dolly 100, operate in a mirror image fashion to the air bag assemblies 72, 74 of each of the tipping and suspension units 60. Such an arrangement prevents excessive buckling of the associated air bags and prevents contact of the air bag with the piston which would impinge on the proper operation of the air bag assemblies 90.

In accordance with the above described embodiments, the first and second air bag assemblies 72, 74 of each axle 12 provide two different operational "functions". Firstly, the first and second air bag assemblies 72, 74 of each axle 12 can be operated to provide a "tipping function" which enables the tub 20 to be tipped relative to a pivot axis $P_1$ of the trailer 10 so that the payload can be discharged via the pivotal door 26a to the discharge side of the trailer 10. Secondly, the first and second air bag assemblies 72, 74 of each axle 12 can be arranged and operated to provide a "suspension function" for the trailer 10 during normal transit operation similar to conventional air bag shock absorbers.

The "tipping function" of each tipping and suspension unit 60 is best illustrated in FIGS. 4 and 9. During normal transit of the trailer 10 along a "flat" road, the tub 20 is maintained in the orientation shown in FIG. 4. In this orientation the lower face 40b of the tub base 40 is located substantially horizontally and the upper face of each of the first and second air bag assembly 72, 74 is located at the approximately the same vertical height above the axle 12.

In order to cause tipping of the tub 20, the lower face 40b of the tub base 40 must be displaced away from the horizontal position shown in FIG. 4. FIG. 9 shows the lower face 40b displaced away from the horizontal a sufficient angular distance to enable the payload from the tub 20 to be fully discharged upon opening of the pivotal door 26a. Displacement of the lower face 40b of the tub base 40 away from the horizontal is achieved by selective inflation and deflation of the first and second air bag assemblies 72, 74 and the air bag assemblies 90. For example, as shown in FIG. 9, second air bag assembly 74 is inflated more than the first air bag assembly 72 so that tub base 40 caused to pivot about pivot axis $P_1$ in a clockwise direction when viewed from the rear of the trailer 10 (i.e. as viewed in FIG. 4).

It has been recognised that in some instances it may be desirable to have the ability to lift the tub 20 upwardly. For example, it may be desirable to lift the tub 20 upwardly prior to tipping. Lifting of the tub 20 upwardly would be achieved by inflating both of the first and second air bag assemblies 72, 74 and the air bag assemblies 90. Limit straps are provided at either end of the shock absorbers 75 between the axle 12 and the suspension towers 64, 66. The suspension will thus be able to rise until the limit straps are reached and then tipping occurs. Limit straps are also preferably provided between the tub base 40 and each support member 62 and the tub base 40c and each hinging support member 80.

A linking bar 91 is preferably provided between each adjacent pair of tipping and suspension units 60.

It will of course be appreciated that each of the tipping and suspension units 60 of the trailer 10 would preferably be controlled by a controller (not illustrated) to provide uniform pivotal movement of the tub 20 along its entire length. Differing air pressures in the air bags assemblies 72, 74 of the various units may need to be allowed depending on the nature and distribution of the payload within the tub 20. The controller would also control operation of the air bag assemblies 90.

The "suspension" function of the tipping and suspension units 60 derives from the fact that the tub 20, tub base 40 and the payload within the tub 20 is supported by the air bag assemblies 72, 74, 90. During normal transit, the air bags 72, 74, 90 will act to cushion movement of the tub 20 and tub base 40 by providing shock absorption in a manner similar to conventional air bag suspension systems. It will thus be appreciated that in accordance with an embodiment of the present invention, the need for a separate air bag shock absorbing suspension system in addition to the air bags used to cause "tipping" is eliminated.

Figure 11:
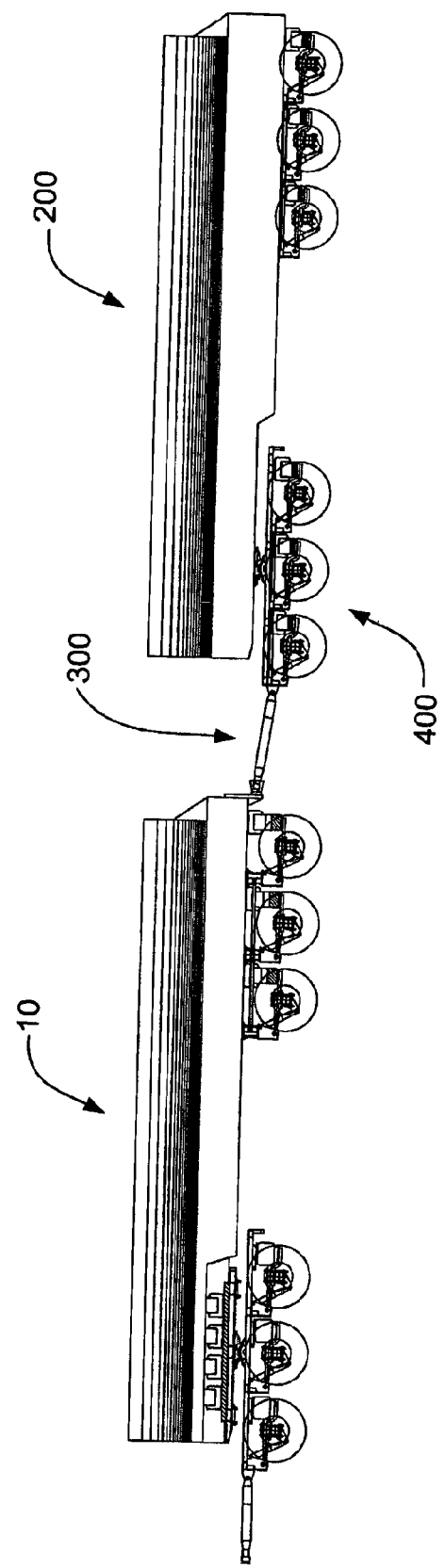
FIG. 11 is a side view of two trailers according to an embodiment of the invention connected end to end to form a road train.

FIG. 11 illustrates the connection of leading trailer 10 with a following trailer 200 to form a road train. A trailer hitch 300 connected to the rear of the leading trailer 10 connects to a modified dolly 400. The dolly 400 is modified to include tipping and suspension units similar to that described previously in relation to the trailer 10 shown in FIG. 1.

The front end of the following trailer 200 connects to the modified dolly 400 using a convention $5^{th}$ wheel. As depicted, the leading trailer 10 shown in FIG. 11 is identical to the trailer 10 described previously. The following trailer 200 has a different shaped tub base 240 to accommodate height changes due to the lower pivot point $P_1$.

Dolly 400 is different to the conventional dolly 100 shown in FIG. 1. More particularly, dolly 400 has been modified to enable tipping of the following trailer 200 without necessitating any modification to the front end of the following trailer 200. Thus it can be seen that the rear end of the trailer 200 is fitted with three tipping and suspension units 260 which are modified versions of the tipping and suspension units 60 described previously. The tipping and suspension units 260 and associated tub base 240 have been modified to take into account the height differences due to the front end of the trailer 200 being connected to the modified dolly 400.

Figure 13:
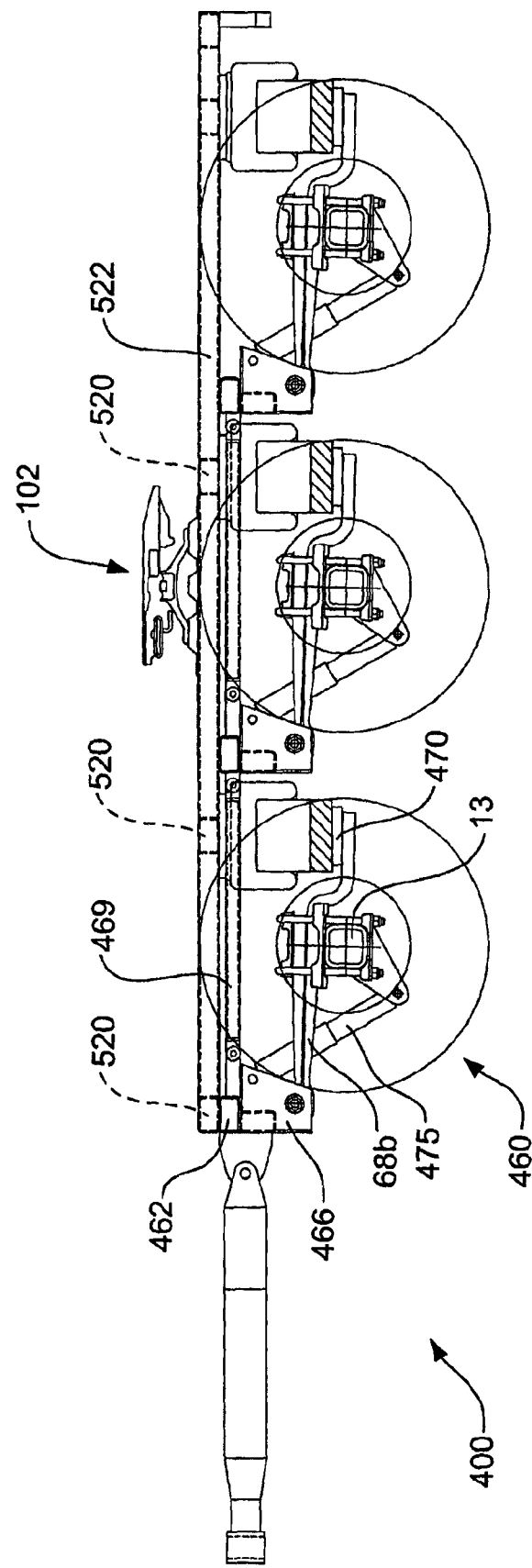
FIG. 13 is a side view of a dolly in accordance with an embodiment of the invention and as also shown in FIG. 11.

FIGS. 13 and 14 illustrate in more detail the dolly 400. FIG. 13 shows the dolly 400 in the normal transit or non-tipped position and FIG. 14 shows the dolly 400 in the tipped position.

The dolly 400 includes three tipping and suspension units 460 which are very similar the tipping and suspension units 60 described previously in connection with the trailer 10.

Each tipping and suspension unit 460 includes a support member 462 that extends transversely between right and left side suspension towers 464, 466. The suspension towers 464, 466 are located on a leading side of the associated axle 12 (as viewed in FIG. 13). Connected to the lower end of each right and left suspension towers 464, 466 are respective right and left suspension trailing arm 468a, 468b. Each suspension trailing arm 468a, 468b connects along its length to the associated axle 12 in the conventional manner. A transverse air bag mounting plate 470 extends between the right and left trailing arms 468a, 468b and provides a base for mounting of the first and second air bag assemblies 472, 474. Shock absorbers 475 are connected between the axle 12 and each of the right and left suspension towers 464, 466.

Stiffening struts 469 are provided between the ends of the hinging support members 462 to stiffen the tipping and suspension units.

As viewed in FIG. 14, the right hand end of the support member 462 is arranged for pivotal connection to a $5^{th}$ wheel frame 500. The front end of the trailer 200 is arranged for connection to the $5^{th}$ wheel 102 secured to the $5^{th}$ wheel frame 500.

The $5^{th}$ wheel frame 500 includes three hinging frame members 520 (one associated with each tipping and suspension unit 460). The three hinging frame members 520 extend transversely between and connect to left and right beams 522, 524 and thereby form the frame 500. Connected to an upper face of the centre hinging frame member 520 is the $5^{th}$ wheel 102.

Figure 12A:
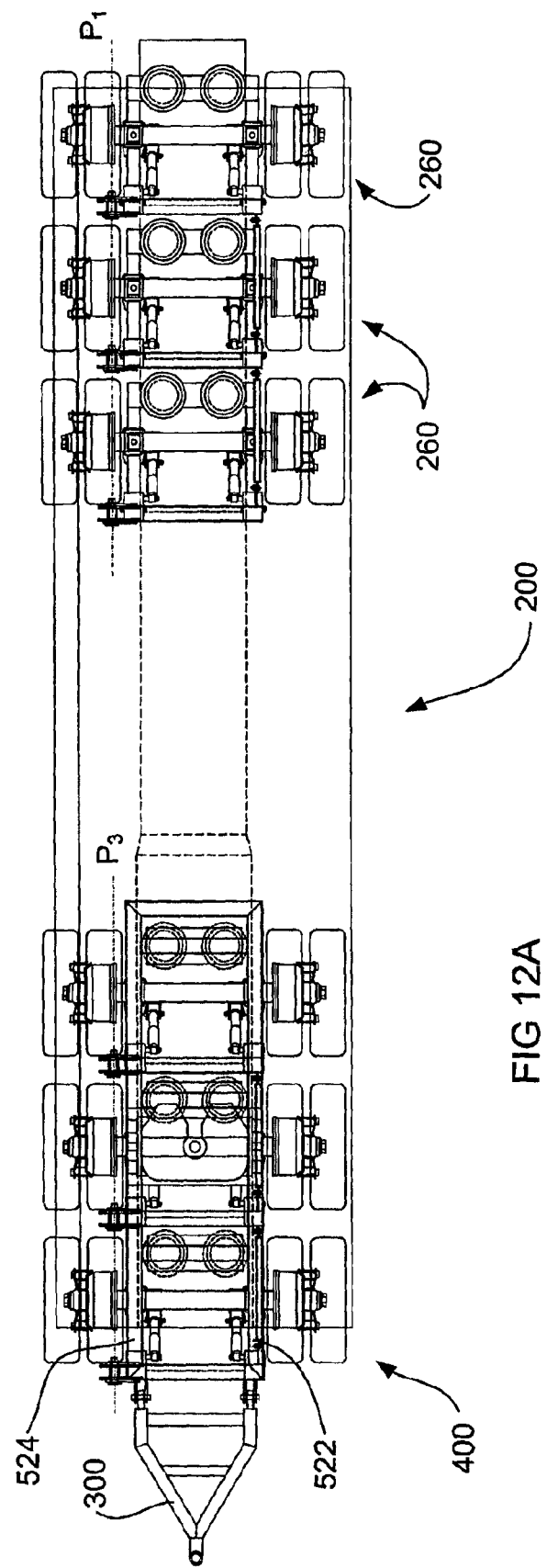
FIG. 12A is a plan view of the following trailer shown in FIG. 11.
Figure 12B:
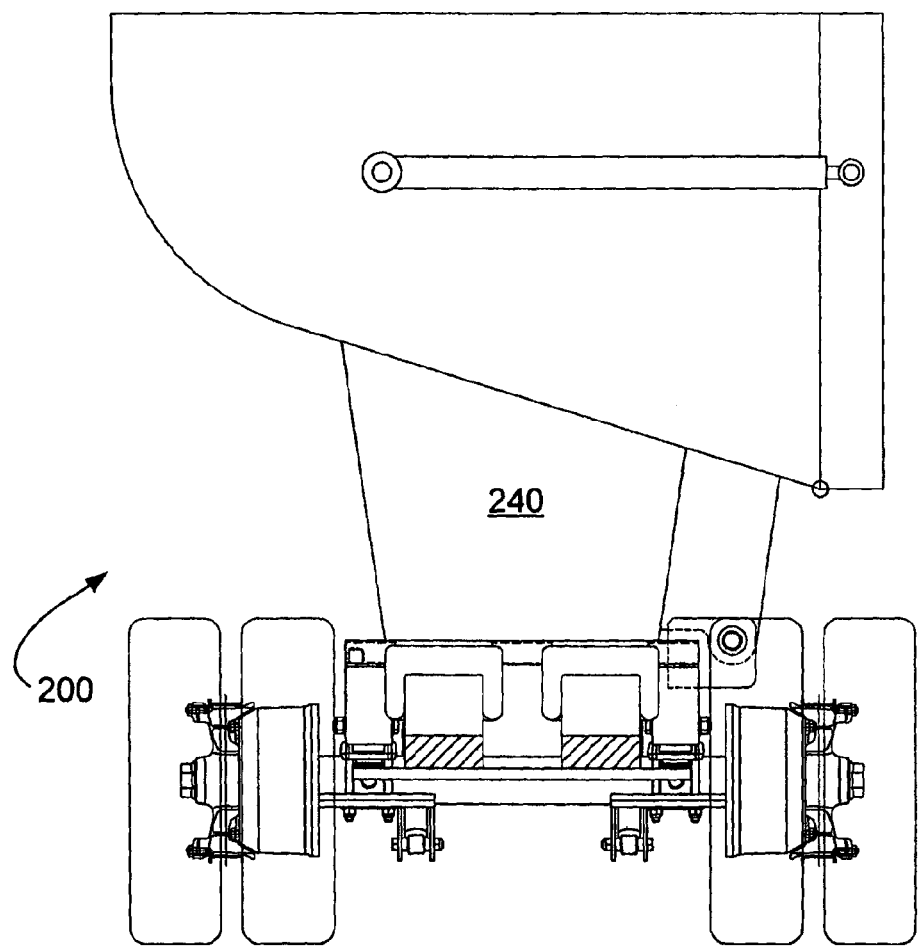
FIG. 12B is a rear view of the following trailer shown in FIG. 11.

Each hinging frame member 520 is arranged for pivotal connection to the associated support member 462. A pair of plates 462a, 462b extend from each support member 462 and are arranged to receive the right hand end (as viewed in FIG. 14) of the associated hinging frame member 580 therebetween. A connector 478 extends through aligned apertures in the plates 462a, 462b and the hinging frame member 580. The connector 478 establishes a longitudinal pivot axis $P_3$ (see FIG. 12A) that is parallel to the left and right beams 522, 524 and parallel to the pivot axis $P_1$ of the tipping and suspension units 60 of the attached trailer 200 when the trailer 200 is aligned as per FIG. 12A.

The first and second air bag assemblies 472, 474 are mounted on the air bag mounting plate 470. The upper end 472a, 474a of each air bag assembly 472, 474 is attached to the lower face 40b of a plate 550. It will thus be appreciated then when the air bag assemblies 472, 474 are inflated they will press upwardly against the plate 550 causing the $5^{th}$ wheel frame 500 to lift upwardly and to pivot about the longitudinal pivot axis $P_3$ of the connector 478. In this manner, $5^{th}$ wheel frame 500 and attached front end of the trailer 200 can be moved from their normal transit position (see FIGS. 15B and 16B) to a discharge position (see FIGS. 15A and 16A). Deflation of the air bag assemblies 472, 744 returns the $5^{th}$ wheel frame 500 and the attached front end of the trailer 200 from the discharge position to the normal transit position.

The tipping and suspension units 460 of the dolly 400, like the tipping and suspension units 60 described previously in relation to trailer 10, includes air bag arrangements that provide both a "suspension" function and a "tipping" function.

It will be appreciated by a person skilled in the art that the tipping and suspension arrangements described above would require various compressors, controllers, valves, gates, sensors etc to ensure proper control and operation. Such additional components have not been described herewith because their arrangement and operation are considered to be matters of common general knowledge to a person skilled in the art.

The embodiments of the invention described above offer different advantages in light of the prior art. However, it will be appreciated that each of the illustrated embodiments makes use of at least one actuator in the form of an air bag arrangement to cause tipping of the tub to enable discharge of the payload (i.e. to enable pivoting movement of the hinging member about the pivot axis). The use of an air bag arrangement for pivoting/tipping is particularly advantageous as it negates the need for hydraulic tipping rams to tip the tub reducing the weight of the resultant tipping arrangement. Furthermore, servicing costs would be reduced because of the removal of the tipping hydraulics. However, it should be appreciated that the use of other forms of actuators is envisaged.

The tub base, that transmits the load of the tub and any payload to the axles of the trailer and/or any attached dolly, pivots with the tub. The tub base provides the load carrying support for the tub without the traditional chassis arrangement shown in the prior art. The weight of the tub base is less than a traditional chassis arrangement decreasing the total unloaded haul body weight and thus greater payload can be carried while still not exceeding total weight limits.

Additionally, each of the described embodiments incorporates a tub with a sloped floor. Such a tub minimises the required tipping angle of the tub that needs to be provided by the tipping arrangement. However, other arrangements of the tub may be used in conjunction with the present invention.

The embodiments have been described by way of example only and modifications within the spirit and scope of the invention are envisaged.

The invention claimed is:

1. A side tipping haul body including a tub for receiving a payload, a tub base and a support member:
   the tub including a floor, first and second side walls, a front wall and a rear wall, the floor of the tub is angled to slope downwardly from a lowermost point of the first side wall to a lowermost point of the second side wall;
   the tub base is connected to the tub and arranged to support the load of the tub and to transmit that load via the support member to at least one axle of the haul body and to a ground surface;
   the tub base is pivotally connected to the support member establishing a pivot axis that extends parallel to a longitudinal axis of the tub; and
   wherein the second side wall includes a door for enabling release of a payload from the tub when the connected tub and tub base are pivoted about the pivot axis.

2. A haul body according to claim 1 wherein the support member is connected transversely between first and second supports extending in a longitudinal direction, and at least one actuator arranged to enable pivoting movement of the tub base about the pivot axis.

3. A haul body according to claim 2 wherein the at least one actuator is configured to further provide suspension for the haul body.

4. A haul body according to claim 2 wherein the first and second supports and the support member form a frame and a king pin is mounted on the frame for connecting the haul body to a 5$^{th}$ wheel of a dolly or other vehicle.

5. A haul body according to claim 2 wherein the at least one actuator includes an air bag arrangement.

6. A haul body according to claim 5 wherein the air bag arrangement includes a first and a second air bag assembly.

7. A haul body according to claim 1 wherein the tub is mounted on a longitudinally extending support arrangement arranged to transmit the load of the tub and any payload to a ground surface on which the haul body is supported.

8. A haul body according to claim 1 further including a connection for connecting the support member to a vehicle or a dolly, and at least one actuator mounted on the support member and arranged to enable pivotal movement of the tub about the pivot axis.

9. A haul body according to claim 8 wherein the connection includes a king pin arrangement.

10. A haul body according to claim 8 wherein the at least one actuator is located on the support member offset from a longitudinal centerline of the tub and in a direction towards the first side wall.

11. A haul body according to claim 1 wherein the door is pivotally connected to the tub along a door pivot axis and wherein in use the door pivot axis is located generally above and generally centrally of a pair of wheels mounted on one end of an axle of the haul body.

12. A haul body according to claim 11 wherein when the door is in a closed position an outermost face of the door does not extend beyond a width of an outer most of the wheels of the haul body.

13. A haul body according to claim 1 wherein at least one actuator is arranged to tip the floor of the tub through a range of about 0-35°.

14. A haul body according to claim 1 wherein at least one actuator of the haul body is configured to provide suspension for the haul body.

15. A haul body according to claim 1 including at least one actuator which includes an air bag arrangement.

16. A haul body according to claim 15 wherein the air bag arrangement includes an air bag with a base mounted at an angle of about 15° to the horizontal.

17. A haul body according to claim 16 wherein the pivot axis is located below the base of the air bag.

18. A haul body according to claim 1 wherein the floor of the tub slopes downwardly at an angle in the range of 10-30° from the horizontal.

19. A haul body according to claim 1 further including an actuator arrangement for tipping a trailing end of the tub.

* * * * *